(12) United States Patent
Kanade

(10) Patent No.: US 8,634,817 B2
(45) Date of Patent: Jan. 21, 2014

(54) LOCATION INFORMATION FOR CONTROL OF MODE/TECHNOLOGY

(75) Inventor: Parag M. Kanade, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 802 days.

(21) Appl. No.: 12/260,082

(22) Filed: Oct. 28, 2008

(65) Prior Publication Data

US 2010/0105373 A1   Apr. 29, 2010

(51) Int. Cl.
*H04M 3/00* (2006.01)

(52) U.S. Cl.
USPC ..... 455/418; 455/421; 455/456.1; 455/552.1; 455/553.1

(58) Field of Classification Search
USPC .............. 455/211, 418, 456.1, 421, 457, 440, 455/552.1, 553.1
See application file for complete search history.

(56) References Cited

U.S. PATENT DOCUMENTS

| | | | |
|---|---|---|---|
| 6,539,230 B2 | 3/2003 | Yen | |
| 6,889,049 B2 | 5/2005 | Khawand | |
| 2002/0187780 A1* | 12/2002 | Souissi | 455/426 |
| 2004/0116137 A1* | 6/2004 | Bells et al. | 455/466 |
| 2006/0063560 A1* | 3/2006 | Herle | 455/552.1 |
| 2006/0282554 A1* | 12/2006 | Jiang et al. | 710/14 |
| 2008/0125167 A1 | 5/2008 | Fujii | |
| 2008/0254810 A1* | 10/2008 | Fok et al. | 455/456.2 |

FOREIGN PATENT DOCUMENTS

| | | |
|---|---|---|
| EP | 1843613 A1 | 10/2007 |
| EP | 1858278 A1 | 11/2007 |
| EP | 1928200 A1 | 6/2008 |
| GB | 2408896 | 6/2005 |
| JP | 2004221730 A | 8/2004 |
| JP | 2004312092 A | 11/2004 |
| JP | 2008136131 A | 6/2008 |

OTHER PUBLICATIONS

International Search Report—PCT/US2009/062277, International Search Authority—European Patent Office—Mar. 3, 2010.
Taiwan Search Report—TW09813656—TIPO—Dec. 17, 2012.
Written Opinion—PCT/US2009/062277—ISA/EPO—Mar. 3, 2010.

* cited by examiner

*Primary Examiner* — Kamran Afshar
*Assistant Examiner* — Sayed T Zewari
(74) *Attorney, Agent, or Firm* — Arnold J. Gum

(57) ABSTRACT

A multimode wireless communication device utilizes location information provided by a co-located autonomous position location receiver to determine a preferred provider database and associated operating mode and operating technology when an out-of-service condition is encountered. The multimode wireless communication device can utilize active preferred provider database while in service and while acquired within a network. The multimode wireless communication device can initiate location-based mode and technology control when in an out-of-service condition. The multimode wireless communication device determines its location and based on the location, accesses a database to determine a preferred provider database. The preferred provider database provides a hierarchical list of available systems and associated information for acquiring and registering with the systems. The multimode wireless communication device reduces a search time and associated power consumption using location-based mode and technology control.

24 Claims, 4 Drawing Sheets

LOCATION INFORMATION FOR CONTROL OF MODE/TECHNOLOGY

BACKGROUND

Mobile wireless communication devices typically operate under challenging channel conditions. A mobile wireless communication device may traverse deep channel fades that affect the ability of the device to acquire or maintain an active communication link within a particular communication system.

A communication system supporting mobile wireless communication devices may be deployed over a limited geographic area further affecting the ability of a mobile wireless communication device from acquiring or maintaining an active communication link with the system. Although some communication systems, such as cellular telephone communication systems, may be deployed over substantially an entire nation or an entire continent, coverage holes may exist in the system. Furthermore, there is currently no cellular telephone wireless communication system that is deployed worldwide. A service provider may be restricted from populating a worldwide network due to, for example, different communication standards adopted in different countries, an inability to obtain spectrum licenses within regions or countries, or costs associated with deploying a worldwide system.

A mobile wireless communication device may be implemented as a multimode wireless communication device in order to address the possibilities of coverage holes as well as to provide multi-country support. The multimode wireless communication device may have the ability to tune to various operating bands and reconfigure itself to support various technologies. However, the ability to support multiple technologies and the ability to support multiple operating bands from at least a subset of the multiple technologies create potential acquisition problems for a multimode wireless communication device.

A mobile wireless communication device typically is battery powered. Extending the service time of the mobile wireless communication device supported by a particular battery configuration, commonly referred to as a battery life, is important in satisfying a user's desire for extended untethered communication access. Searching for and attempting to acquire systems of particular technologies or technologies within particular operating bands may be a fruitless endeavor in some geographic regions. The time associated with scanning for and acquiring a supported communication system may create an undesirable delay when initially acquiring a communication system over which the multimode wireless communication device may communicate. Moreover, the process of searching for and attempting to acquire particular communication systems, across supported technologies and operating bands, may unnecessarily consume power and decrease the battery life.

A multimode wireless communication device needs to manage acquisition and monitoring of the multitude of supported technologies and operating bands in light of the competing desire to extend battery life.

SUMMARY

A multimode wireless communication device utilizes location information provided by a co-located autonomous position location receiver to determine a preferred provider database and associated operating mode and operating technology when an out-of-service condition is encountered. The multimode wireless communication device can utilize active preferred provider database while in service and while acquired within a network. The multimode wireless communication device can initiate location-based mode and technology control when in an out-of-service condition. The multimode wireless communication device determines its location and based on the location, accesses a database to determine a preferred provider database. The preferred provider database provides a hierarchical list of available systems and associated information for acquiring and registering with the systems. The multimode wireless communication device reduces search time and associated power consumption using location-based mode and technology control.

Aspects of the invention include a method of controlling an operating mode of a multimode wireless communication device. The method includes determining an out-of-service condition, determining a geographic location of the multimode wireless communication device, and configuring the multimode wireless communication device based in part on the geographic location.

Aspects of the invention include a method of controlling an operating mode of a multimode wireless communication device. The method includes determining an out-of-service condition, determining a geographic location of the multimode wireless communication device, determining a predetermined geographic region associated with the geographic location, identifying a mode table based on the geographic region, the mode table identifying at least one technology of a plurality of wireless communication technologies supported by the multimode wireless communication device, determining mode information from a mode entry of the mode table, and configuring the multimode wireless communication device for one of the plurality of wireless communication technologies supported by the multimode wireless communication device based in part on the mode information.

Aspects of the invention include an apparatus for multimode wireless communication. The apparatus includes a reconfigurable wireless transceiver, a positioning system receiver configured to determine a geographic location, a mode database configured to store information identifying a plurality of geographic regions and information relating to each of a plurality of modes, and a mode controller configured to access the mode database and determine a supported mode based on the geographic location, and reconfigure the reconfigurable wireless transceiver for the supported mode.

Aspects of the invention include an apparatus for multimode wireless communication. The apparatus includes means for determining an out-of-service condition, means for determining a geographic location of the multimode wireless communication device, and means for configuring the multimode wireless communication device based in part on the geographic location.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Figure 1:
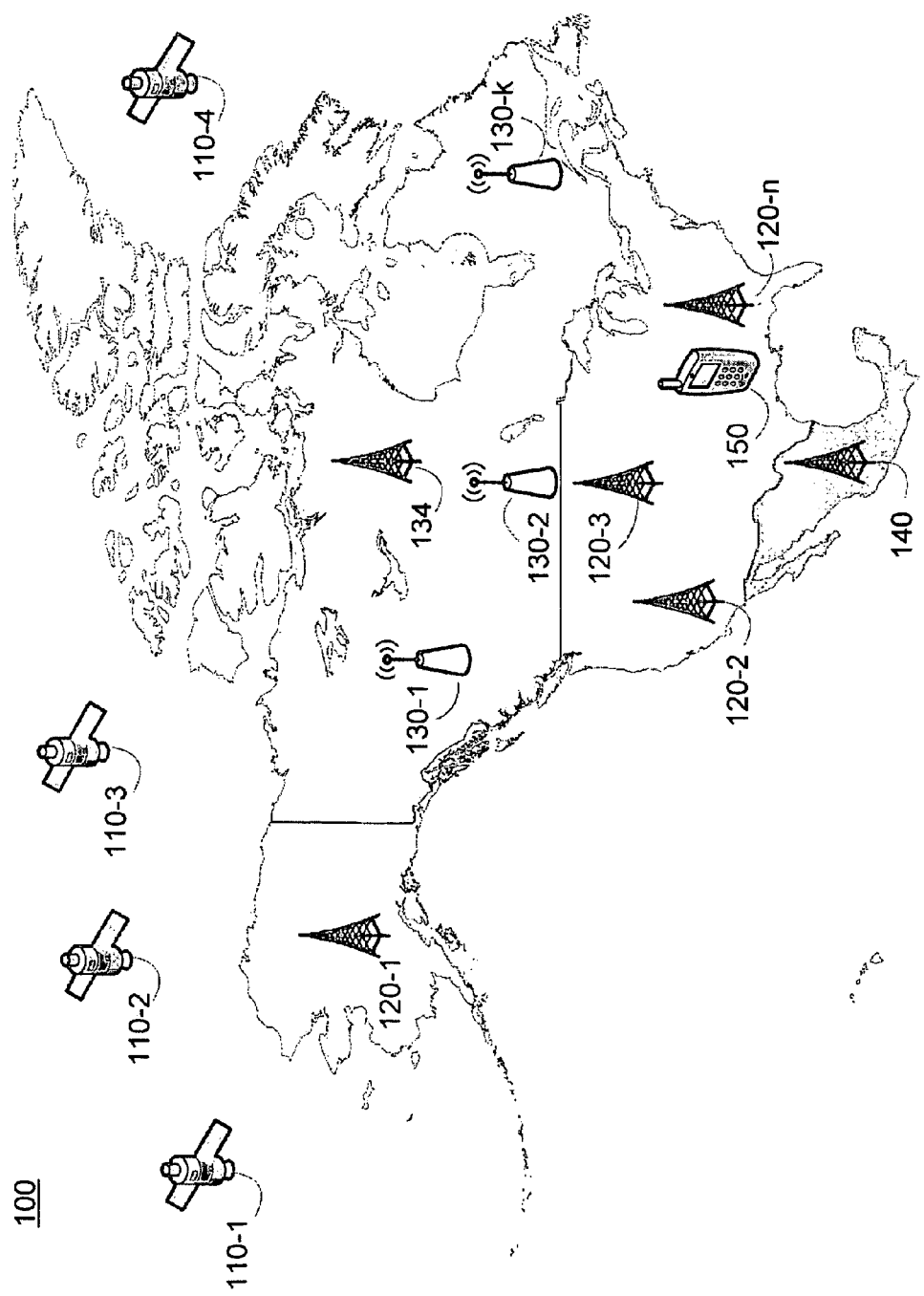
FIG. 1 is a simplified functional block diagram of an embodiment of a system having a multimode wireless communication device with location-based mode and technology control.

As described above, multimode wireless communication devices can be configured to support multiple technologies, for e.g., CDMA, HDR, GSM, UMTS, and WLAN on a single chip. System selection for these multiple technologies should attempt to achieve a fine balance between speed of acquisition and battery life. In one example, an operator might support CDMA and HDR in North America and might have roaming agreements on GSM and UMTS in Europe. While in North America the multimode wireless communication device should prefer to acquire and operate in one of a CDMA or HDR mode and should be configured to scan for these technologies. If the user travels to Europe, the same multimode wireless communication device should prefer to acquire and operate in GSM and UMTS mode and be configured to scan for these technologies. Scanning for all the supported technologies while out of service is inefficient both in terms of re-acquisition performance and battery life. The processing time and power consumption utilized for scanning may not be evident to a user, because scanning may occur in the foreground or in the background. In the above example, scanning for GSM and UMTS while in North America not only costs power, but also delays acquiring CDMA or HDR service, since time is spent on scanning for UMTS and GSM.

The methods and apparatus described herein enable using location information obtained from a position location system to select the mode and technology to scan for service while in an out of service condition or state. Scanning may occur in the foreground or as a background operation. For example, scanning may occur in the foreground during initial acquisition, but may be performed as a background operation in other instances, such as during neighbor or candidate searching.

Although the methods and apparatus are described herein in the context of a multimode device, such methods and apparatus can be used to optimize performance of a single mode device, where operational parameters associated with the signal mode, such as operating frequency or operating band, may be efficiently determined based in part on geographic location.

A multimode wireless communication device may include position location capabilities. For example, it is common for a wireless communication device such as a cellular telephone to include standalone GPS capabilities. The multimode wireless communication device can use, for example, the GPS fixes to enable the multimode wireless communication device to obtain current geographic location. The multimode wireless communication device can be configured with a database associating geographic location to supported technologies that are likely present in that location.

At power-up or upon losing service, the multimode wireless communication device can use a local position location technology to determine its current geographic location. The multimode wireless communication device can access the database and select or otherwise determine a list of the technologies and the related configuration information to scan for service in that geographical location. By searching for available technologies that are dynamically customized to the determined geographic location, the multimode wireless communication device conserves battery power and decreases response time by eliminating the time and resources needed to scan for technologies that are not likely to be available in the geographic location. The re-acquisition of service is improved because the multimode wireless communication device is not spending time reconfiguring and scanning for unavailable technologies.

FIG. 1 is a simplified functional block diagram of an embodiment of a system 100 having a multimode wireless communication device 150 with location-based mode and technology control. Although the system 100 of FIG. 1 is illustrated and described in the context of determining a service provider in North America based on GPS satellite positioning, the apparatus and methods are not limited to any particular geographic region, nor is the position location technique limited to GPS or even satellite-based positioning.

A multimode wireless communication device 150 is positioned in a geographic region. If the multimode wireless communication device 150 has recently arrived at the location, for example, as a result of air travel, the device 150 may need to initially acquire signals from a particular supported service provider in order to establish wireless communications over the associated network. Upon initial power-up, the wireless communication device 150 can be considered to be in an out-of-service condition or state.

The multimode wireless communication device 150 has the capability to support multiple service providers operating with multiple technologies over multiple operating bands. For example, a first wireless network may support a first geographic region, such as the United States. The first wireless network can have a first set of base stations 120-1 through 120-$n$ disposed throughout the supported geographic region.

A second wireless network may support a second geographic region that can be overlapping or exclusive of the first geographic region. The second wireless network can have a second set of base stations 130-1 through 130-$k$ positioned across the second geographic region. Similarly, a third wireless network may support a third geographic region, shown in FIG. 1 as within the same general region supported by the second wireless network. The third wireless network can have a third set of base stations 134 positioned across the third geographic region. Likewise, a fourth wireless network may support a fourth geographic region and can have a fourth set of base stations 140 positioned across the fourth geographic region.

The multimode wireless communication device 150 may support communications with additional wireless networks in other geographic regions. The number of wireless networks and the associated geographic regions illustrated in FIG. 1 are illustrative and not intended to represent any limitation on the methods and apparatus described herein.

Each of the first, second, third, and fourth wireless networks may utilize, for example, different technologies and different operating bands. When in an out of service state, the multimode wireless communication device 150 can be configured to scan for and attempt to acquire wireless networks according to a predetermined preferred provider hierarchy. However, a predetermined preferred provider hierarchy does not take into account the changes in service providers and technology types that may be presented to the multimode wireless communication device 150.

The multimode wireless communication device 150 can utilize knowledge of its geographic location in order to dynamically update the preferred provider hierarchy, including possibly adding, deleting, and reordering the systems and system providers listed in the preferred provider hierarchy. By updating the systems and system providers listed in the preferred provider hierarchy, the multimode wireless communication device 150 can optimize the scanning and acquisition attempts in order to facilitate fast acquisition while simultaneously decreasing power consumption.

The multimode wireless communication device 150 can include a position location receiver that enables the multimode wireless communication device 150 to autonomously determine its geographic location. In one example, the multimode wireless communication device 150 includes a satellite positioning system (SPS) receiver and is able to autonomously determine its geographic location based on signals received from a plurality of navigation satellites.

The SPS receiver can support positioning using position location systems in existence or developed in the future, for example, the NAVSTAR Global Positioning System (GPS), the Russian GLONASS positioning system, the upcoming European Galileo positioning system, the proposed COMPASS navigation system of China, the Indian Regional Navigational Satellite System (IRNSS), and the like, or some combination thereof. As used herein, an SPS will also be understood to include pseudolite systems. The SPS receiver receives signals from one or more SPS satellites, 110-1 through 110-4, and determines the geographic location of the multimode wireless communication device 150.

As an example, position measurements using GPS are based on measurements of propagation delay times of GPS signals broadcast from the orbiting satellites 110-1 through 110-4 to the GPS receiver within the multimode wireless communication device 150. Normally, reception of signals from 4 satellites is required for precise position determination in 4 dimensions (latitude, longitude, altitude, and time). Once the receiver has measured the respective signal propagation delays, the range to each satellite is calculated by multiplying each delay by the speed of light. Then, the location and time are found by solving a set of four equations with four unknowns incorporating the measured ranges and the known locations of the satellites. The precise capabilities of the GPS system are maintained by means of on-board atomic clocks for each satellite and by ground tracking stations that continuously monitor and correct satellite clock and orbit parameters.

Each GPS satellite, e.g. 110-1, transmits direct-sequence-coded spread spectrum signals in the L-band. A signal transmitted by each of the satellites, 110-1 through 110-4, referred to as an L1 signal, consists of two phase-shift keyed (PSK) spread spectrum signals modulated in phase quadrature. The signals include a P-code signal (P for precise) and a C/A-code signal (C/A for coarse/acquisition). The P-code signals are encrypted, and are not generally available for commercial and private users.

The C/A codes are repetitive pseudo-random sequences of bits that are modulated onto the carrier. The clock-like nature of these codes is utilized by the GPS receiver in making time delay measurements. The codes for each satellite are unique, allowing the receiver to distinguish which satellite transmitted a given code, even though they may all be at the same carrier frequency. Also modulated onto each carrier is a 50 bit/sec data stream that contains information about system status and satellite orbit parameters, which are needed for the navigation calculations.

Once the GPS receiver in the multimode wireless communication device 150 determines the pseudoranges to each of the four satellites 110-1 through 110-4, the GPS receiver can resolve the geographic position and any local timing inaccuracy. The multimode wireless communication device 150 can access a wireless mode/technology database that relates a geographic location or region to one or more lists of preferred provider hierarchies. The multimode wireless communication device 150 can then scan for and attempt to acquire wireless communication systems according to the hierarchy provided from the list of preferred providers that is retrieved based on the geographic location of the multimode wireless communication device 150.

Although a precise position fix may unambiguously identify which of a plurality of preferred provider hierarchies is the optimal list of providers, the multimode wireless communication device 150 need not necessarily identify its geographic location with precision in order to determine an optimal or improved list of preferred providers. Instead, the multimode wireless communication device 150 may accept a position fix having a large region of uncertainty in order to more quickly determine the desired list of preferred providers.

For example, using signals from four satellites 110-1 through 110-4 may permit the multimode wireless communication device 150 to determine a position fix having accuracy on the order of meters. However, determining a position fix based on signals from three satellites 110-1 through 110-3 may not be sufficient to resolve a local timing inaccuracy with respect to GPS time, but such inaccuracy may have virtually no effect on the selection of preferred provider list. The time needed to acquire and determine a position fix based on three satellites 110-1 through 110-3 may be sufficiently less than the time to determine a position fix using four satellites 110-1 through 110-4.

Further reductions in satellite signals may further increase the geographic uncertainty in the resultant position fix. For example, signals from a single satellite, e.g. 110-1, may only permit determination of the hemisphere in which the multimode wireless communication device 150 resides. Yet, under certain circumstances, such as a North American national network, such information may be sufficient to resolve the identity of a preferred provider list, and from that list, a preferred technology and operating mode. Indeed, such determination of a preferred provider list may be no different than the solution using a position fix having accuracy on the order of meters.

The multimode wireless communication device 150 can utilize augmentation information or assumptions in order to reduce the number of satellite signals needed to make a position fix with sufficient accuracy to unambiguously resolve a list of preferred providers from which scanning and acquisition is attempted. For example, the multimode wireless communication device 150 may include one or more local sensors that are capable of providing augmenting information. In one example, the multimode wireless communication device 150 can include a sensor that permits the multimode wireless communication device 150 to determine its altitude. In another embodiment, the multimode wireless communication device 150 can use a predetermined altitude assumption, such as sea level or a mean earth radius, in order to reduce the variables that need to be solved to determine the position fix. Use of such local augmentation data or assumptions can reduce the time to determine the position fix with little or no effect on which preferred provider list is retrieved from the database.

Figure 2:
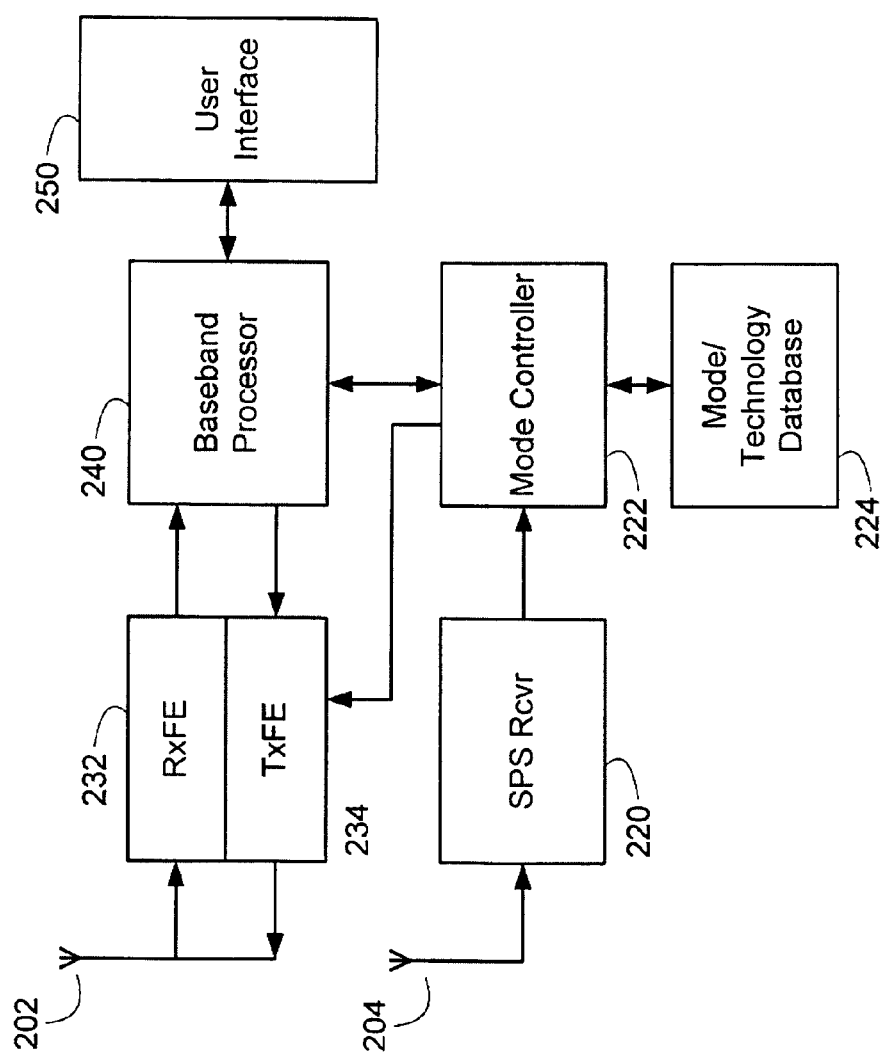
FIG. 2 is a simplified functional block diagram of an embodiment of a wireless device having location-based mode and technology control.

FIG. 2 is a simplified functional block diagram of an embodiment of a multimode wireless communication device 150 having location-based mode and technology control. The multimode wireless communication device 150 can be, for example the multimode wireless communication device of the system of FIG. 1. As an example, the multimode wireless communication device 150 can be a cellular telephone, wireless terminal, wireless modem, and the like or some combination thereof.

The multimode wireless communication device 150 can include a first antenna 202 coupled to a reconfigurable communication transceiver. In one embodiment, the reconfigurable communication transceiver can be reconfigured to support any one or more of a plurality of duplex operations such as Frequency Division Duplex (FDD) operation, Time Division Duplex (TDD) operation, or some combination thereof. The reconfigurable communication transceiver can include a reconfigurable receive front end 232 and a reconfigurable transmit front end 234.

Each of the receive front end 232 and the transmit front end 234 may have one or more reconfigurable parameters or modules. For example, each of the receive front end 232 and the transmit front end 234 may utilize a programmable local oscillator whose frequency determines the operating RF band. Additionally, each of the receive front end 232 and the transmit front end 234 may have one or more programmable filters, whose bandwidth varies depending on the technology being actively supported.

The reconfigurable communication transceiver is coupled to a reconfigurable baseband processor 240. The reconfigurable baseband processor 240 can be reconfigured to support any one of multiple technologies. For example, the baseband processor 240 can be configured to support, for example, some combination of CDMA, HDR, GSM, UMTS, WLAN, LTE, or WiMax technologies.

The baseband processor 240 can be coupled to a user interface 250 that can include, for example, a display, input devices, and output devices. The input devices typically include a keyboard or keypad, a microphone, and an electrical input interface. Output devices typically include a speaker, an electrical output interface, audio output devices, and optical output devices such as video devices, text displays, lamps or other optical output or some combination thereof. Some input devices may also serve as output devices. For example a haptic feedback device, such as a force feedback joy stick may serve as both an input device as well as an output device.

The multimode wireless communication device 150 can be configured to accept user control input via the user interface 250. In one embodiment, the user may selectively enable or disable, via the user interface 250, the autonomous location based mode and technology selection, and the location based determination of a preferred provider list. As an example, the user may override scanning for service and lock a particular service provider, even if such control limits the ability to communicate in certain geographic regions.

The multimode wireless communication device 150 also includes a second antenna 204 that may be distinct from the first antenna 202 or may be in some instances physically integrated with the first antenna 202. The second antenna 204 can be optimized to receive the signals from a position location system, such as a SPS, a terrestrial position location system, or some combination thereof. The SPS can be, for example, GPS, GLONASS, Galileo, a pseudolite system, and the like or some combination thereof.

The position location signals are coupled from the second antenna 204 to a position location receiver, illustrated as a SPS receiver 220 in the embodiment of FIG. 2. The SPS receiver 220 is configured to determine a position fix having an accuracy that is based in part on the number and quality of position location system signals available. The SPS receiver 220 can include one or more sensors that provide augmentation data that reduces the number of satellite signals needed to provide a position fix of a given accuracy. For example, the SPS receiver 220 can include a sensor that provides an output indicative of the altitude of the multimode wireless communication device 150. In other embodiments, the SPS receiver 220 may utilize one or more assumptions that operate to reduce the number of independent position location system signals needed to determine a position fix of a particular accuracy. For example, the SPS receiver 220 can assume a predetermined altitude or can presume a predetermined clock bias relative to time in the signals.

The SPS receiver 220 determines the geographic location of the multimode wireless communication device 150 and provides the geographic location to a mode controller 222. The mode controller 222 determines if a location based preferred provider list or table is to be retrieved from memory for use in acquiring or otherwise scanning for service. The mode controller 222 can, for example, determine if the multimode wireless communication device 150 is presently in an out-of-service state, such as upon power-up or upon loss of service.

The mode controller 222 can then determine if retrieval of an updated location based preferred provider list is desirable. For example, the mode controller 222 may initiate retrieval of an updated location based preferred provider list upon power up or if the out-of-service state has remained active for greater than a predetermined period of time. If an out-of-service condition has not existed for greater than a predetermined period of time, the mode controller 222 can continue to use a preferred provider list identified by a last known position, and may configure the modules based on the last known network. Similarly, the mode controller 222 can initially configure the modules based on the last known position and last known network upon power-up.

The mode controller 222, upon determining that retrieval of an updated location based preferred provider list is desirable, accesses a mode/technology database 224. The mode/technology database 224 associates a particular geographic region to a preferred provider list. In one embodiment, the mode/technology database 224 can include multiple predetermined preferred provider lists, and the mode controller 222 can determine which of the predetermined lists to select based on the geographic location determined by the SPS receiver 220. In another embodiment, the mode/technology database 224 can be a relational database that relates geographic regions to each of a plurality of supported modes and technologies. The mode controller 222 can generate a list of modes and technologies based on the geographic location and can generate a preferred provider list by ordering the list according to a hierarchy.

After generating or otherwise retrieving the preferred provider list, the mode controller 222 proceeds to configure the reconfigurable transceiver and baseband processor 240 for each of the modes Land technologies identified by the preferred provider list. The multimode wireless communication device 150 scans for service and attempts to acquire each of the modes and technologies. The scanning process can terminate once the multimode wireless communication device 150 acquires a wireless communication system.

Figure 3:
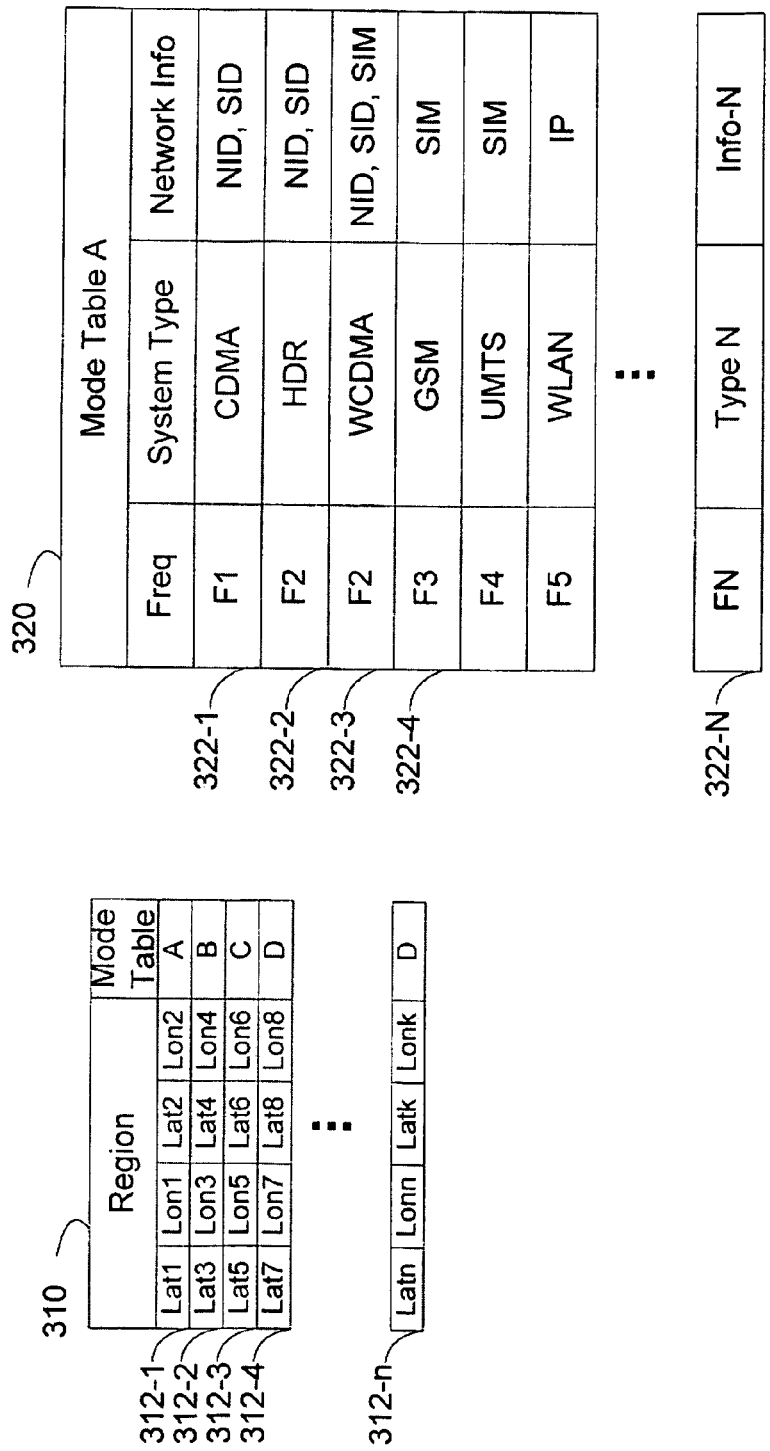
FIG. 3 is a simplified functional block diagram of an embodiment of data for location-based mode and technology control.

FIG. 3 is a simplified functional block diagram of an embodiment of data for location-based mode and technology control. The data can represent, for example, structure of data stored within the mode/technology database of the multimode wireless communication device 150 of FIG. 2.

FIG. 3 illustrates the data as being organized as a series of flat files. However, this particular data organization is illustrative and is not meant to limit or restrict the manner in which the mode/technology data can be organized.

The data includes a geographic association table 310 that relates a geographic region to a mode table. In the embodiment of FIG. 3, the geographic association table 310 includes fields defining opposite corners of a rectangular region. The geographic association table 310 also associates a mode table with the geographic region.

In the embodiment of FIG. 3, the geographic association table 310 includes a first association data 312-1 that includes fields defining a first geographic region. As an example, the first two fields can define the latitude and longitude of an upper left hand corner of a first geographic region, while the next two fields define latitude and longitude of a lower right hand corner of the first geographic region. The next field in the first association data 312-1 identifies the mode table associated with the first geographic region.

The geographic association table 310 can include any number of association data needed to associate all modes and technologies supported by the multimode wireless device and their associated system coverage areas with geographic regions. In the embodiment of FIG. 3, the geographic association table 310 includes second association data 312-2 associating a second geographic region with a second mode table, third association data 312-3 associating a third geographic region with a third mode table, fourth association data 312-4 associating a fourth geographic region with a fourth mode table, and nth association data 312-n associating a nth geographic region with a nth mode table. The defined geographic regions are typically mutually exclusive in order to eliminate ambiguities in relationships. Alternatively, if the geographic regions are not mutually exclusive, the multimode wireless communication device 150 may utilize a resolver or resolution process to determine which of a plurality of possible solutions to select.

The mode tables associated with the geographic regions need not be and atypically are not unique. Several geographic regions may map to or otherwise be associated with the same mode table. In the example of FIG. 3, the geographic region in the fourth association data 312-4 maps to the same mode table as the geographic region of the nth association data 312-n.

An example of a mode table 320 illustrates types of data that may be included within a mode table. In general, the mode table 320 includes the data and information for identifying a technology and mode supported within the geographic region and information and data necessary for configuring the reconfigurable transceiver and baseband processor to enable the multimode wireless communication device to communicate in the technology and mode.

The information can include, for example, an operating frequency or frequencies of the transmit and receive bands, a type or technology of the system, and network information needed to establish communication within the system. As an example, the mode table 320 includes a first mode entry 322-1 that identifies a first operating frequency, F1, that can correspond, for example, to a receive frequency. A transmit frequency can be determined from the receive frequency, for example, based on the system type. The first mode entry 322-1 also includes one or more fields that identify CDMA as the system type or technology type. The first mode entry 322-1 also includes one or more fields that identify information needed to establish communications in the CDMA system. Such information can include, for example, System Identification (SID) and Network Identification (NID) information.

The mode table 320 example of FIG. 3 also includes a second mode entry 322-2 that identifies an HDR system and associated data, a third mode entry 322-3 that identifies a WCDMA system and associated data, a fourth mode entry 322-4 that identifies a GSM system and associated data, and Nth mode entry 322-N that identifies a Type N system and associated data. Any number of modes or technology types may be identified, and each mode entry need not identify a unique technology type, but may include unique network information, for example, to identify a preference between systems of the same technology type. The mode table 320 includes up to N distinct entries, where each entry identifies a unique system or unique access parameter, although not necessarily a unique technology.

Figure 4:
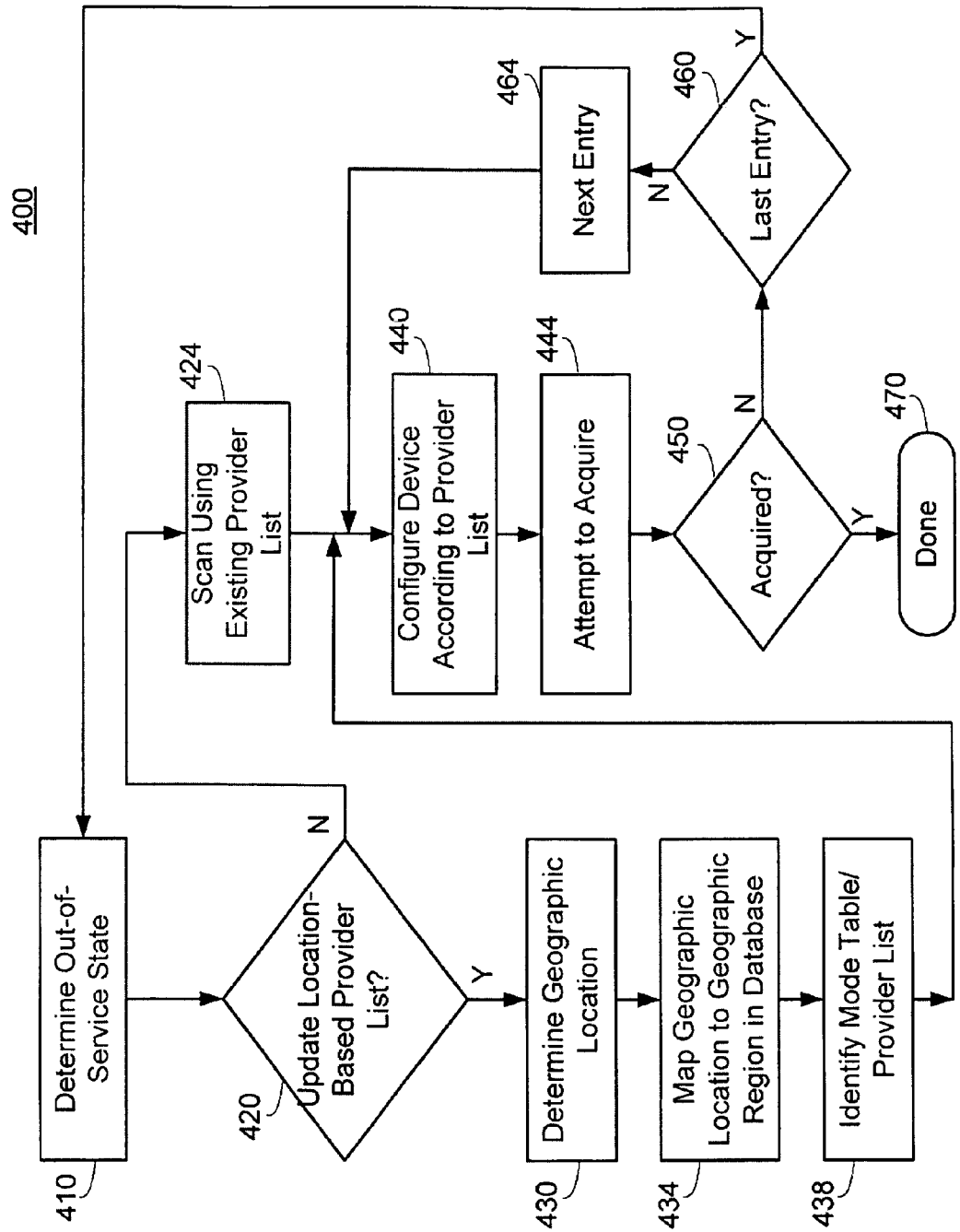
FIG. 4 is a simplified flowchart of an embodiment of a method of location-based mode and technology control.

FIG. 4 is a simplified flowchart of an embodiment of a method 400 of location-based mode and technology control. The method 400 can be performed, for example, by the multimode wireless communication device of FIG. 2. In one embodiment, the method 400 is embodied as one or more processor or computer readable instructions encoded on storage media. A processor in the multimode wireless communication device can execute the instructions in order to perform the method 400.

The method 400 begins at block 410, where the multimode wireless communication device determines that it is in an out-of-service state or condition. The multimode wireless communication device may determine that it has transitioned to this state, for example, upon initial power-up, when an established communication link is dropped due to unavailability, based on user input such as a user request for an updated preferred provider list or user initiated updated scan, based on remote command, and the like, or some combination thereof.

The multimode wireless communication device proceeds to decision block 420 and determines if an update of a preferred provider list is desired as a result of the out-of-service state. In one embodiment, the multimode wireless communication device can determine whether to update the preferred provider list based on the manner in which the multimode wireless communication device transitioned to the out-of-service state. For example, if the multimode wireless communication device transitioned to the out-of-service state based on a power-up condition, the multimode wireless communication device may immediately attempt to update the preferred provider list. Alternatively, if the multimode wireless communication device transitions to the out-of-service state due to a dropped communication link, the multimode wireless communication device may continue to retry to acquire systems from the existing provider list, initiate a timer and initiate update of the preferred provider list if the timer exceeds a predetermined threshold. The predetermined threshold may be a static threshold or may be a dynamically determined threshold that may be learned or otherwise revised according to usage of the wireless communication device.

If conditions for updating the preferred provider list are not satisfied, the attempt to update the preferred provider list proceeds to block 424 and continues to utilize the existing preferred provider list. The multimode wireless communication device proceeds from block 424 to block 440.

If, at decision block 420, the multimode wireless communication device determines that the conditions are satisfied for updating the preferred provider list, the multimode wireless communication device proceeds to block 430. At block 430, the multimode wireless communication device determines its geographic location. The multimode wireless communication device may, for example, initiate a position location process or may access an independent position location process to access the geographic location determined by the position location process. In one embodiment, the position location process is executed by a SPS receiver within the multimode wireless communication device.

The multimode wireless communication device proceeds to block 434 and maps or otherwise relates or associates the geographic location of the multimode wireless communication device to a geographic region in a database; for example, mapping the geographic location to a geographic region in which the geographic location is bounded. The multimode wireless communication device can, for example, access a mode/technology database that relates geographic regions to modes and technologies.

The multimode wireless communication device proceeds to block 438 and identifies a mode table or preferred provider list that is associated with the geographic region which includes the geographic location of the multimode wireless communication device. In one embodiment, the multimode wireless communication device determines a mode table that is a predetermined flat file including a preferred provider list. In another embodiment, the multimode wireless communication device accesses a relational database that forms the preferred provider list based on the geographic region or geographic location.

The multimode wireless communication device proceeds to block 440, and using the information in the preferred provider list, configures one or more variable modules within the multimode wireless communication device for a particular technology and mode. The multimode wireless communication device proceeds to block 444 and attempts to acquire the system for which the multimode wireless communication device is presently configured.

The multimode wireless communication device proceeds to decision block 450 to determine if the acquisition attempt was successful. If so, the multimode wireless communication device proceeds to block 470 and the method 400 is done.

If, at decision block 450, the multimode wireless communication device determines that the acquisition attempt was unsuccessful, the multimode wireless communication device proceeds to decision block 460 to determine if the current configuration corresponds to the last entry in the preferred provider list. If not, the multimode wireless communication device proceeds to block 464 and accesses the next entry in the preferred provider list and then proceeds back to block 440 to reconfigure and attempt access of the system.

If, at decision block 460, the multimode wireless communication device determines that the unsuccessful scan attempt was based on the last entry in the preferred provider list, the multimode wireless communication device proceeds back to block 410 to remain in the out-of-service-state.

Methods and apparatus are described herein for determining possible modes and technologies to scan for when in an out of service state from myriad providers supported by a multimode wireless communication device. The multimode wireless communication device utilizes its geographic location to optimize the preferred provider list and the associated modes and technologies for which to execute an acquisition attempt.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software or firmware, the functions may be stored on a physical computer-readable medium as one or more instructions or code. Computer-readable media includes physical computer storage media. A storage medium may be any available physical medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

Computer instructions/code may be transmitted via signals over physical transmission media from a transmitter to a receiver. For example, the software or firmware may be transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of controlling an operating mode of a multimode wireless communication device, the method comprising:
   determining an out-of-service condition;
   determining whether the multimode wireless communication device entered the out-of-service condition due to a dropped communication link or otherwise;
   choosing a plurality of possible operating modes by:
      in response to the multimode wireless communication entering the out-of-service condition due to a dropped communication link, choosing a current plurality of possible operating modes as a desired plurality of possible operating modes; and otherwise:
  determining a geographic location of the multimode wireless communication device;
  replacing the current plurality of possible operating modes with a different plurality of possible operating modes, as the desired plurality of possible operating modes, based in part on the geographic location;
configuring the multimode wireless communication device in accordance with a selected operating mode of the desired plurality of possible operating modes; and
attempting to acquire a signal using the selected operating mode.

2. The method of claim 1, further comprising:
associating the geographic location with a predetermined geographic region; and
identifying the different plurality of possible operating modes based on the geographic region.

3. The method of claim 2, wherein identifying the configuration of the multimode wireless communication device comprises:
identifying a mode table associated with the geographic region; and
determining a wireless system technology from information within the mode table.

4. The method of claim 1, further comprising configuring the multimode wireless communication device for a last known network based on a last known position if the out-of-service condition fails to satisfy predetermined conditions.

5. The method of claim 1, wherein determining the geographic location of the multimode wireless communication device comprises:
receiving at least one position location signal from a Satellite Positioning System (SPS); and
determining the geographic location based in part on the at least one position location signal.

6. The method of claim 5, wherein receiving at least one position location signal comprises receiving position location signals from three distinct satellites.

7. The method of claim 5, further comprising:
determining augmentation information, and
wherein determining the geographic location comprises determining the geographic location based on the at least one position location signal and the augmentation information.

8. The method of claim 7, wherein determining the augmentation information comprises determining augmentation information from a sensor within the multimode wireless communication device.

9. The method of claim 7, wherein determining the augmentation information comprises determining a positioning assumption.

10. The method of claim 1, wherein configuring the multimode wireless communication device comprises configuring the multimode wireless communication device for one of CDMA or UMTS technologies supported by the multimode wireless communication device.

11. The method of claim 1, wherein configuring the multimode wireless communication device comprises configuring the multimode wireless communication device for one of CDMA, HDR, GSM, UMTS, or WLAN technologies supported by the multimode wireless communication device.

12. The method of claim 11, wherein configuring the multimode wireless communication device further comprises configuring a local oscillator for a frequency associated with a selected technology.

13. A method of controlling an operating mode of a multimode wireless communication device, the method comprising:
determining an out-of-service condition;
determining whether the multimode wireless communication device entered the out-of-service condition due to a dropped communication link or otherwise;
choosing a plurality of possible operating modes by:
  in response to the multimode wireless communication entering the out-of-service condition due to a dropped communication link, choosing a current mode table as a desired mode table; and
  otherwise:
    determining a geographic location of the multimode wireless communication device;
    determining a predetermined geographic region associated with the geographic location; and
    replacing the current mode table with a different mode table as the desired mode table based on the geographic region, each of the current and different mode tables identifying at least one technology of a plurality of wireless communication technologies supported by the multimode wireless communication device;
determining mode information from a mode entry of the desired mode table; and
configuring the multimode wireless communication device for one of the plurality of wireless communication technologies supported by the multimode wireless communication device based in part on the mode information.

14. The method of claim 13, wherein determining the geographic location comprises determining a position location solution based on at least one signal received from a satellite of a satellite positioning system.

15. The method of claim 13, wherein determining the predetermined geographic region comprises determining the predetermined geographic region in which the geographic location is bounded.

16. The method of claim 13, wherein configuring the multimode wireless communication device comprises:
configuring a reconfigurable wireless transceiver; and
configuring a reconfigurable baseband processor.

17. An apparatus for multimode wireless communication, the apparatus comprising:
a reconfigurable wireless transceiver;
a positioning system receiver configured to determine a geographic location;
a mode database that stores information identifying a plurality of geographic regions and information relating to each of a plurality of modes; and
a mode controller configured to:
  access the mode database;
  determine that the apparatus is in an out-of-service condition;
  determine whether the apparatus entered the out-of-service condition due to a dropped communication link or otherwise;
  choose a plurality of possible operating modes by:
    in response to the multimode wireless communication entering the out-of-service condition due to a dropped communication link, choosing a current set of modes in the mode database as a desired set of modes; and
    otherwise:
      changing the current set of modes in the mode database to analyze to a different set of modes as the desired set of modes;

determine a supported mode, of the desired set of modes, based on the geographic location; and
reconfigure the reconfigurable wireless transceiver for the supported mode.

18. The apparatus of claim 17, further comprising:
a reconfigurable baseband processor coupled to the reconfigurable wireless transceiver, and
wherein the mode controller reconfigures the reconfigurable baseband processor for the supported mode.

19. The apparatus of claim 17, wherein the positioning system receiver comprises a satellite positioning system receiver.

20. The apparatus of claim 17, wherein the mode database comprises a plurality of flat files, each flat file including information relating a geographic region to a mode table defining a list of mode entries providing mode configuration information.

21. The apparatus of claim 17, wherein the mode database comprises a relational database relating geographic regions to modes supported within the geographic regions.

22. The apparatus of claim 17, wherein the plurality of modes comprises at least one of:
a CDMA mode;
an HDR mode;
a GSM mode;
an LTE mode;
a WiMax mode; or
a UMTS mode.

23. An apparatus for multimode wireless communication, the apparatus comprising:
means for determining an out-of-service condition;
means for determining whether the multimode wireless communication device entered the out-of-service condition due to a dropped communication link or otherwise;
means for choosing a plurality of possible operating modes by:
in response to the multimode wireless communication entering the out-of-service condition due to a dropped communication link, choosing a current plurality of possible operating modes as a desired plurality of possible operating modes; and
otherwise:
determining a geographic location of the multimode wireless communication device;
replacing the current plurality of possible operating modes with a different plurality of possible operating modes, as the desired plurality of possible operating modes, based in part on the geographic location;
means for configuring the multimode wireless communication device in accordance with a selected operating mode of the desired plurality of possible operating modes; and
means for attempting to acquire a signal using the selected operating mode.

24. A non-transitory storage medium encoded with processor executable instructions, when executed by a processor, performing:
determining an out-of-service condition of a multimode wireless communication device;
determining whether the multimode wireless communication device entered the out-of-service condition due to a dropped communication link or otherwise;
choosing a plurality of possible operating modes by:
in response to the multimode wireless communication entering the out-of-service condition due to a dropped communication link, choosing a current mode table as a desired mode table; and
otherwise:
determining a geographic location of the multimode wireless communication device;
determining a predetermined geographic region associated with the geographic location; and
replacing the current mode table with a different mode table as the desired mode table based on the geographic region, each of the current and different mode tables identifying at least one technology of a plurality of wireless communication technologies supported by the multimode wireless communication device;
determining mode information from a mode entry of the desired mode table; and
configuring the multimode wireless communication device for one of the plurality of wireless communication technologies supported by the multimode wireless communication device based in part on the mode information.

* * * * *